United States Patent [19]

Schultz

[11] 4,455,583
[45] Jun. 19, 1984

[54] COMPENSATION FOR DIMENSIONAL CHANGES IN A RECORD MEDIUM

[75] Inventor: Ralph H. Schultz, Norristown, Pa.

[73] Assignee: Sperry Corporation, New York, N.Y.

[21] Appl. No.: 391,206

[22] Filed: Jun. 23, 1982

[51] Int. Cl.³ .......................... G11B 21/08; G11B 5/55
[52] U.S. Cl. ...................................... 360/78; 318/561; 318/634; 318/652
[58] Field of Search .............................. 360/75, 77, 78; 318/561, 632, 634, 652

[56] References Cited

U.S. PATENT DOCUMENTS

| | | | |
|---|---|---|---|
| 3,720,930 | 3/1973 | Elsing | 360/75 |
| 3,731,292 | 5/1973 | Kelley | 340/174.1 E |
| 3,815,150 | 6/1974 | Stoddard et al. | 360/97 |
| 3,863,266 | 1/1975 | Hoshino | 360/86 |
| 3,951,264 | 4/1976 | Heidecker et al. | 206/444 |
| 3,959,823 | 5/1976 | Heidecker et al. | 360/99 |
| 4,348,624 | 9/1982 | Anderson et al. | 318/634 |

Primary Examiner—George G. Stellar
Attorney, Agent, or Firm—James R. Bell; Marshall M. Truex

[57] ABSTRACT

A track positioning apparatus for a (floppy) disk record medium to compensate for physical changes in the disk resulting from variations in temperature or humidity. A grating, used to position a read-write head, includes reference marks thereon corresponding to reference tracks on the disk. The grating is stretched or compressed proportionally during a calibration operation to compensate for changes in the flexible disk.

7 Claims, 1 Drawing Figure

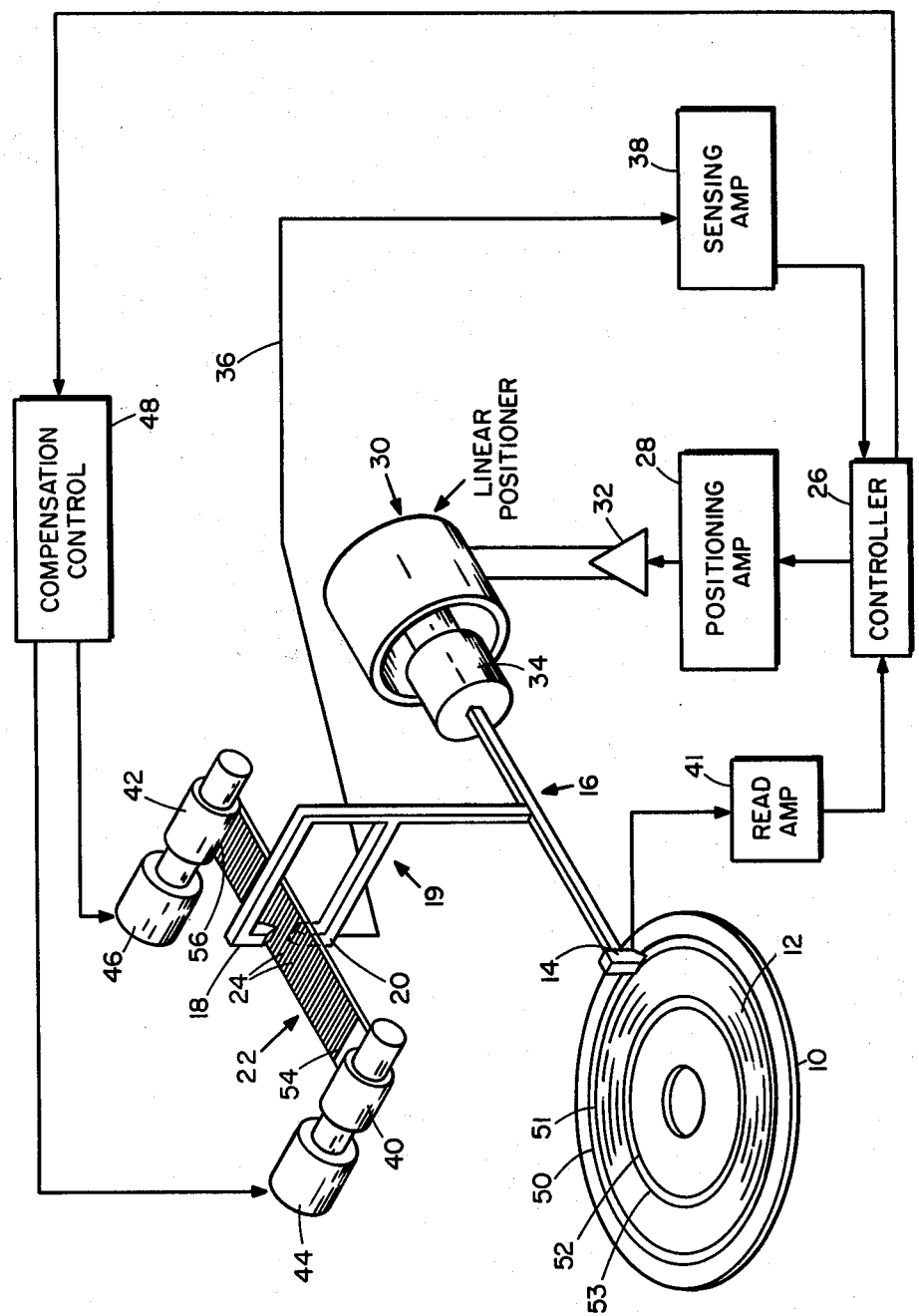

4,455,583

COMPENSATION FOR DIMENSIONAL CHANGES IN A RECORD MEDIUM

BACKGROUND OF THE INVENTION

1. Field of the Invention

This invention relates generally to dynamic magnetic information storage or retrieval and more particularly to compensating for the physical changes in flexible disk media due to temperature and humidity when operating with high track densities.

2. Description of the Prior Art

The computer industry has made extensive use of disks for data storage which include rigid and flexible or floppy disks. The disks are generally made of a very thin plastic base with a magnetic oxide coating and are rotated during operation. The data is generally recorded on a plurality of relatively closely spaced tracks. A read-write head is selectively moved to selected tracks to read or write data on the tracks.

One of the ways commonly used in rigid disk technology to position the read-write head over a selected track involves the use of a grating having spaced indicia or marks thereon corresponding to the track positions on the record medium. A sensor, which may be a light sensor, is used to detect the positions of the marks. The sensor is moved in steps across the grating to a particular preselected mark representative of the position to which the read-write head is to be positioned. The read-write head is moved across the record medium concurrently with the movement of the sensor over the grating until the sensor stops at the selected mark on the grating thereby simultaneously positioning the head at the desired track.

The spacing between tracks on the flexible or floppy disks in many systems is typically 0.017 inches as is well understood. The amount of data which may be recorded is dependent upon closer spacing of a larger number of tracks. When the spacing is typically 0.017 inches, increasing the number of tracks with closer spacing presents limitations with respect to positioning the read-write head. This is especially true when, as is generally the case, the disks are subject to physical changes which produce dimensional variations as a result of changes in the environment such as temperature or humidity.

In prior art systems which have utilized a grating with markings thereon to position a read-write head, the grating has been composed of fixed or rigid material which is substantially immune to dimensional changes. However, the flexible disk used as the record medium normally does change in dimension in response to variations in temperature or humidity. These changes in the disk dimensions cause the physical positions of the recorded tracks on the disk to change also. Thus, even though the sensor is positioned over a select mark on the fixed grating, the read-write head may not be precisely positioned over the track to be selected on the disk. If the misalignment is too great, the read-write head may actually be positioned between two adjacent tracks.

With the tendency towards higher track densities in floppy disks, the alignment of the read-write head becomes acute and small dimensional changes in the disk could result in the read-write head actually being positioned over the wrong track.

The foregoing illustrates limitations of the known prior art. Thus, it is apparent that it would be advantageous to provide an alternative directed to overcoming one or more of the limitations as set forth above. Accordingly, a suitable alternative is to provide a device for compensating for the physical changes in flexible disk media due to temperature and humidity when operating with high track densities.

SUMMARY OF THE INVENTION

In one aspect of the present invention, this is accomplished by providing an apparatus for compensating for dimensional changes in a recording medium of the type having first and second reference tracks with information tracks therebetween. A flexible member includes first and second reference indications with information indications therebetween which correspond in position to the reference and information tracks on the recording medium. Means are provided for selectively positioning a read-write head over one of the tracks and for correspondingly positioning a sensor for sensing one of the indications on the flexible member. Means are provided for maintaining the flexible member in tension and the maintaining means are movable for expanding and contracting the flexible member. Control means are coupled between the read-write head and the sensor for moving the positioning means. Other means are coupled to the control means for moving the maintaining means.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWING

In the drawing:

The drawing FIGURE is a diagrammatic representation, partly in block diagram form illustrating an embodiment of the present invention.

DESCRIPTION OF THE PREFERRED EMBODIMENT

Referring particularly to the drawing FIGURE, an apparatus for positioning a magnetic read-write head over a selected track on a flexible recording medium such as a floppy disk 10, is illustrated. Disk 10 includes a plurality of information tracks 12 recorded concentrically thereon. A moveable read-write head 14 is adapted to be selectively moved to one of the selected tracks 12 on the disk 10 during a read or write operation. An assembly 16 includes a sensor 19 comprising a light emitting diode 18 and a photo cell 20. The light emitting diode 18 and photo cell 20 are spaced with a flexible grating 22 disposed therebetween.

The grating 22 includes a plurality of indicia or marks 24 which are closely spaced with the relative spacings therebetween corresponding to the spacings between the information tracks 12. The assembly 16 also includes the read-write head 14, so that both the sensor 19 and the read-write head 14 are moved in unison. The positioning of the head 14 with respect to a specific track on the disk 10 is achieved by means of aligning the sensor 19 with the corresponding indicia or mark on the grating 22. The positioning per se may be accomplished by conventional means.

During the operation of the illustrated positioning apparatus in a computer system, a programmed position command signal is applied to a controller 26 which generates a signal to move the assembly 16 so that the sensor 19 and the read-write head 14 are moved to a selected track position to write data on the disk or read data recorded thereon. The signal for positioning the sensor 19 and head 14 is applied from the controller 26 through a positioning amplifier 28. The output signal from the positioning amplifier 28 is applied to a linear positioning device 30 through a servo amplifier 32. The linear positioning device 30 may comprise a voice coil of the conventional type in which an electrical signal is applied to a coil to move an element 34 in accordance with the applied signal. The element 34, being mechanically connected thereto moves the assembly 16 and hence the sensor 19 associated with the grating 22, and the read-write head 14 associated with the disk 10. The assembly 16 is moved in increments thereby causing the sensor 19 to be stepped across the marks 24. The sensor 19 generates an electrical pulse as it passes each mark 24 on the grating 22. The generated electrical pulse signals are coupled via a line 36 and a sensing amplifier 38 to controller 26 where they are counted. Such means for positioning a read-write head is conventional and therefore not shown or described in detail.

Each electrical pulse signal from amplifier 38 is applied to the controller 26 and is combined therein with the programmed position command signal to produce a difference signal representative of the remaining distance the assembly 16 must be moved to position the head over the selected track position. This difference signal is coupled from the controller 26 to the positioning amplifier 28.

Thus far, the system described, except for the flexible grating 22 in place of a rigid grating, is conventional and used in many computer systems including means for positioning read-write heads with respect to floppy disks. Heretofore the grating 22 used for positioning has been fixed and tended to introduce inaccuracies when the disk 10 was subjected to unpredictable dimensional changes.

In systems used heretofore, the grating 22 generally comprised a transparent solid piece of material having lines or markings thereon or a solid material with holes or slots therein. The sensor 19 was stepped to the correct position in accordance with the applied signals through the linear positioner 30.

The grating 22 comprises a flexible member under tension which may be expanded or contracted. Preferably, grating 22 comprises a transparent plastic material, such as Mylar, having relatively darker indicia thereon. The grating 22 is disposed between, and held in tension by, a pair of rollers 40 and 42. The rollers 40 and 42 are adapted to be rotated in either of a clockwise and a counterclockwise direction a small amount by a pair of bi-directional driving motors 44 and 46, respectively. The grating 22 is normally maintained in tension so that any release of the pressure provided by the rollers 40 and 42, caused by a small rotation of the motor 44 in the counterclockwise direction or the motor 46 in the clockwise direction, will permit the grating to contract. The grating 22 has sufficient resilience or flexibility so that if additional pressure is exerted by the rollers 40 and 42, the grating 22 will expand. This is caused when the motor 44 is moved clockwise or the motor 46 is moved counterclockwise. The amount of tension in the rollers 40 and 42 is dependent upon the signals applied to motors 44 and 46 from a compensator control circuit 48.

During a calibration period, a signal is generated in a manner to be described, and applied to the compensator control circuit 48. The compensator control circuit 48 will then alternately actuate one or the other of the motors 44 and 46 to alternately cause slight rotation in either of two directions of the rollers 40 or 42, with the direction of rotation being determined by whether the grating 22 is to be contracted or expanded.

The grating 22 comprises a pair of reference indicia or marks including an inner reference indicia or mark 54 and an outer reference indicia or mark 56. The disk 10 includes outer reference tracks 50, 51 and inner reference tracks 52, 53. Pairs of reference tracks have been illustrated, although single tracks may be employed. The information tracks 12 are disposed between the inner and outermost reference tracks. The indicia marks 24 on the grating 22 are spaced between the reference marks 54 and 56 and correspond to the positions of the information tracks 12 on the disk 10.

The reference marks 54 and 56 are distinguishable from the marks 24 disposed therebetween by being made much heavier or thicker in shade or width than the marks 24. Also as mentioned above, the marks may be holes or slots in non-transparent material. The reference marks or indicia 54 and 56 are spaced to correspond respectively to the positions of the outer and inner reference tracks 50, 51 and 52, 53 of the disk 10. This is to say that when the magnetic head 14 is disposed between the outer reference tracks 50, 51, the sensor 19 will be positioned over the outer reference mark 56 on the grating 22, if no compensation is required. In like manner, when the read-write head 14 is disposed between the inner reference tracks 52, 53, the sensor 19 will be positioned over the inner reference mark 54, again if no compensation is required. If the position of sensor 19 over the reference marks 54, 56 does not correspond to the position of the head 14 between the reference tracks, 52, 53 or 50, 51 respectively, then the magnetic head 14 will be inaccurately positioned over the information tracks 12 on the disk 10.

As mentioned above, one of the limitations in flexible or floppy disks is that they are subject to dimensional changes resulting from changes in ambient temperatures or humidity conditions. When dimensional changes in the disk occur with the grating 22 maintained in its same physical dimension as in the prior art, the read-write head 14 will not be correctly positioned. In order to correctly position the read-write head 14, means for compensating for the unpredictable dimensional changes in the disk must be provided. This is accomplished in the present invention by making the grating 22 flexible and periodically going through a calibration operation in which the grating 22 is contracted or expanded. For example, if the reference tracks 50, 51 and 52, 53 on the disk 10 do not line up with the reference marks 56 and 54 respectively, on the grating 22, an operation to bring the reference marks into a corresponding relationship with the reference tracks must take place.

In utilizing the present invention, periodic calibration is provided and will be described generally with reference to the drawing FIGURE. The calibration operation consists of a set of iterative steps in which the first step comprises moving the assembly 16 so that the sensor 19 is aligned with the inside reference mark 54 on the grating 22 and the head 14 is positioned over or close to the inside reference tracks 52, 53 on the disk 10. If the head 14 is not precisely positioned between the reference tracks 52, 53, a position error signal is generated in the head 14 and coupled through the read amplifier 41 to the controller 26. As mentioned above, the controller 26 also receives output signals from the sensing amplifier 38. These amplifier output signals are combined with the position error signal in the controller 26 to produce a correction signal which is applied to the compensator control circuit 48. The output signal from the compensator control circuit 48 is coupled to the motor 44 which rotates the roller 40 about a small angle in the desired direction to contract or stretch the grating 22. As the grating 22 is contracted or stretched, the sensor 19 tracks the inside reference mark 54 because the sensor 19 has been positioned to maintain alignment with the reference mark 54 by the programmed position command signal applied to the controller 26 which produces a position signal that is coupled through the positioning amplifier 28 and servo amplifier 32 to the linear positioner 30. As a result, when the grating 22 is either stretched or contracted and the reference mark 54 moves away from the position of alignment with the sensor 19, a signal is generated in the sensor 19 and coupled via line 36 to the sensing amplifier 38 indicative of the out-of-alignment condition. The amplifier 38 produces an output signal which is applied to the controller 26 and combined therein with the programmed position command signal. The controller 26 then generates a new position output signal which is coupled through amplifiers 28 and 32 to linear positioner 30 which drives assembly 16 until sensor 19 is aligned with the reference mark 54. This process continues until the head 14 is precisely positioned over the reference tracks 52, 53 and the sensor 19 is aligned with the reference mark 54.

In the second step, the assembly 16 is moved as a result of a second programmed position command signal, so that the sensor 19 is aligned with the outside reference mark 56 on the grating 22 and the head 14 in accordance with the tolerances built into the systems design, is positioned over or close to the outside reference tracks 50, 51 on the disk 10. If the head 14, is not accurately positioned over the reference tracks 50, 51 a position error signal is generated in the head 14 and coupled through the read amplifier 41 to the controller 26. The controller 26 also received output signals from the sensing amplifier 38 and combines these output signals with the position error signal to produce a correction signal that is applied to the compensator control circuit 48. The output signal from the compensator control circuit 48 is coupled to the motor 46 which rotates the roller 42 about a small angle in the desired direction to contract or stretch the grating 22. As the grating 22 is either contracted or stretched, the sensor 19 tracks the outside reference mark 56 in the same manner as described above with respect to the inside reference mark 54 until the head 14 is precisely positioned over the reference tracks 50, 51 and the sensor 19 is aligned with the reference mark 54.

The calibration operation continues to switch back and forth between the positioner motors 46 and 44 because each calibration of one reference mark tends to affect, to some decreasing degree, the position of the other reference mark on the grating 22. There is a positional tolerance associated with the alignment of the sensor 19 and the reference marks 54 and 56 within which the head 14 is regarded as being accurately positioned. After a number of the iterative steps have been completed, the alignment of sensor 19 will be within the positional tolerance and the calibration period is discontinued and normal operation of the positioning system is resumed by application of suitable programmed position command signals.

As mentioned, the grating 22 may comprise a flexible transparent Mylar or any other suitable plastic material. In some cases, the grating media could be constructed from the same type of material as the flexible disk 10 so as to approximate the gross temperature and humidity changes of the flexible disk. Thus the positioning motors 44, 46 for stretching or contracting the grating 22 would be used only for fine difference compensation.

One of the limitations recognized in the foregoing embodiment of the present invention is that the conventional changes in one area of the disk may tend to be different than the changes in other areas due to thickness or width variations of the disk. The grating 22 could be used to provide non-linear compensation by fabricating the grating media with thickness or width variations in accordance with the variations in the disk to introduce predictable stretching due to applied forces.

The conventional double track reference tracks 50, 51 and, 52, 53 illustrated, provide some advantages in positioning the head during the calibration period. For example, the read-write head 14 may detect maximum electrical signals at the two tracks and detect a minimal signal between the maximum signals. The minimum signal point may be made to represent the accurate position of the sensor 19 precisely centered between the pair of reference tracks. Variations of the reference signal read in either direction will provide an advantage insofar as it will detect the position or phase at which the head 14 must be moved to come back to the center position between the reference tracks. If only a single track is employed, a maximum signal would be read by the read-write head 14 but no indication would be present to indicate the phase or direction if the head 14 is misaligned.

It is recognized that there is a maximum degree of motion for the rollers 40 and 42 and that the grating 22 is only to be stretched or contracted within predetermined limits dependent upon the tolerance of the system.

The foregoing has described means for compensating for the physical changes in flexible disk media due to temperature and humidity when operating with high track densities.

It is anticipated that aspects of the present invention, other than those specifically defined in the appended claims, can be obtained from the foregoing description and the drawings.

Having thus described the invention, what is claimed is:

1. Apparatus for compensating for dimensional changes in a recording means comprising:
   a record medium having first and second reference tracks thereon with a plurality of information tracks therebetween;
   a flexible member having first and second reference indications with information indications therebetween corresponding to the positions of said reference and information tracks on said record medium;
   means for selectively positioning a read-write head over one of said tracks and for correspondingly positioning a sensor for sensing one of said indications on said flexible member;

means for maintaining said flexible member in tension, said maintaining means movable for expanding and contracting said flexible member; and control means coupled between said read-write head and said sensor for moving said positioning means; and means coupled to said control means for moving said maintaining means.

2. The apparatus of claim 1 wherein the control means includes a controller, a sensing amplifier coupled to said sensor and to said controller, and read amplifier coupled to said read-write head and to said controller, and a positioning amplifier and a servo-amplifier coupled between said controller and said positioning means.

3. The apparatus of claim 2 wherein said means coupled to said control means includes a compensator control circuit coupled to said maintaining means and to said controller.

4. The apparatus of claim 1 wherein said control means and said means coupled thereto include means for generating a signal and coupled for moving said positioning means via a positioning amplifier and a servo-amplifier, said signal generating means coupled to said read-write head via a read amplifier, coupled to said sensor via a sensing amplifier and coupled to said maintaining means via a compensator control circuit.

5. The apparatus of claim 1 wherein said maintaining means includes a pair of rollers.

6. The apparatus of claim 1 wherein said maintaining means includes a pair of bi-directional motors coupled for expanding and contracting said flexible member.

7. The apparatus of claim 3 wherein said maintaining means includes a pair of bi-directional motors operably connected to a pair of rollers, said flexible member being connected to said rollers.

* * * * *